US009628235B2

(12) United States Patent
Kishiyama et al.

(10) Patent No.: US 9,628,235 B2
(45) Date of Patent: Apr. 18, 2017

(54) COMMUNICATION SYSTEM, BASE STATION APPARATUS, TERMINAL APPARATUS, AND COMMUNICATION METHOD

(71) Applicant: NTT DOCOMO, INC., Tokyo (JP)

(72) Inventors: Yoshihisa Kishiyama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 2 days.

(21) Appl. No.: 14/416,448

(22) PCT Filed: Jun. 18, 2013

(86) PCT No.: PCT/JP2013/066748
§ 371 (c)(1),
(2) Date: Jan. 22, 2015

(87) PCT Pub. No.: WO2014/017224
PCT Pub. Date: Jan. 30, 2014

(65) Prior Publication Data
US 2015/0180632 A1 Jun. 25, 2015

(30) Foreign Application Priority Data
Jul. 25, 2012 (JP) .................... 2012-165176

(51) Int. Cl.
*H04L 1/00* (2006.01)
*H04L 5/00* (2006.01)
(Continued)

(52) U.S. Cl.
CPC ........... *H04L 5/0051* (2013.01); *H04W 24/08* (2013.01); *H04W 52/04* (2013.01)

(58) Field of Classification Search
CPC ..... H04W 80/04; H04W 80/05; H04W 80/06; H04W 80/07; H04W 80/08; H04W 72/04;
(Continued)

(56) References Cited

U.S. PATENT DOCUMENTS

2012/0263068 A1* 10/2012 Morimoto ............. H04W 24/10
370/252
2014/0198744 A1* 7/2014 Wang ................... H04B 7/0617
370/329

FOREIGN PATENT DOCUMENTS

JP 2011-142516 A 7/2011

OTHER PUBLICATIONS

International Search Report for corresponding International Application No. PCT/JP2013/066748, mailed Jul. 23, 2013 (1 page).
(Continued)

*Primary Examiner* — Dady Chery
(74) *Attorney, Agent, or Firm* — Osha Liang LLP (57) ABSTRACT

The present invention is designed to provide a communication system, a base station apparatus, a terminal apparatus and a communication method that can support the diversification of communication. In the communication system of the present invention, in which a terminal apparatus receives a downlink data signal transmitted from a base station apparatus (eNB) in a radio resource region for a downlink data signal, the base station apparatus transmits a terminal-specific reference signal in the radio resource region for the downlink data signal to the terminal apparatus (UE), and the terminal apparatus measures channel quality information based on the terminal-specific reference signal and transmits the measured channel quality information to the base station apparatus.

8 Claims, 5 Drawing Sheets

(51) Int. Cl.
*H04W 52/04* (2009.01)
*H04W 24/08* (2009.01)

(58) Field of Classification Search
CPC . H04W 72/05; H04W 72/06; H04W 72/0446; H04W 72/0447; H04W 72/0448
USPC .................................................. 370/328–338
See application file for complete search history.

(56) References Cited

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2012 (18 pages).
Office Action issued in corresponding Japanese Application No. 2012/165176, mailed May 10, 2016 (7 pages).

\* cited by examiner

COMMUNICATION SYSTEM, BASE STATION APPARATUS, TERMINAL APPARATUS, AND COMMUNICATION METHOD

TECHNICAL FIELD

The present invention relates to a communication system, a base station apparatus, a terminal apparatus and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (the downlink), and a scheme that is based on SC-FDMA (Single Carrier Frequency Division Multiple Access) is used in uplink channels (the uplink).

In LTE, MIMO (Multi Input Multi Output) is defined to improve the data rates (spectral efficiency) by transmitting/receiving data using a plurality of antennas. In MIMO, a plurality of transmitting/receiving antennas are provided in a transmitter/receiver, and different transmitting antennas of the transmitting side transmit different transmission information sequences simultaneously. On the receiving side, information sequences that are transmitted simultaneously are separated and detected by utilizing the fact that different fading variation is produced between transmitting/receiving antennas.

As MIMO transmission schemes, single-user MIMO (SU-MIMO (Single User MIMO)), which transmits transmission information sequences for the same user from different transmitting antennas at the same time, and multi-user MIMO (MU-MIMO (Multiple User MIMO)), which transmits transmission information sequences for different users from different transmitting antennas at the same time, are proposed. In SU-MIMO and MU-MIMO, optimal PMIs (Precoding Matrix Indicators) corresponding to the amount of phase/amplitude control (precoding weights) to be set in antennas are selected from a codebook, and are fed back to a transmitter as channel information (CSI: Channel State Information). On the transmitter side, each transmitting antenna is controlled based on the PMIs fed back from the receiver, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Successor systems of LTE (referred to as, for example, "LTE-advanced" or "LTE enhancement" (hereinafter referred to as "LTE-A")) are under study for the purpose of achieving further broadbandization and increased speed beyond LTE. In this LTE-A system, to further improve the data rates (spectral efficiency), application of beam forming that gives vertical directivity to a beam output from a base station apparatus and MIMO (3D MIMO/beamforming) to use this is under study. Flexible control of downlink transmission power from a base station apparatus (flexible DL power control) is under study.

In a system where a new communication scheme like this is applied, control needs to be designed more user-specific (UE-specific), but in current configurations, it is not possible to fully utilize original performance of the system.

The present invention has been made in view of the above, and therefore it is an object of the present invention to provide a communication system, a base station apparatus, a terminal apparatus and a communication method that can support the diversification of communication.

Solution to Problem

The communication system of the present invention is a communication system in which a terminal apparatus receives a downlink data signal transmitted from a base station apparatus in a radio resource region for a downlink data signal, and in this communication system, the base station apparatus transmits a terminal-specific reference signal in the radio resource region for the downlink data signal to the terminal apparatus, and the terminal apparatus measures channel quality information based on the terminal-specific reference signal and transmits the measured channel quality information to the base station apparatus.

Technical Advantage of the Invention

According to the present invention, it is possible to provide a communication system, a base station apparatus, a terminal apparatus, and a communication system that can support the diversification of communication.

DESCRIPTION OF EMBODIMENTS

Figure 1A:
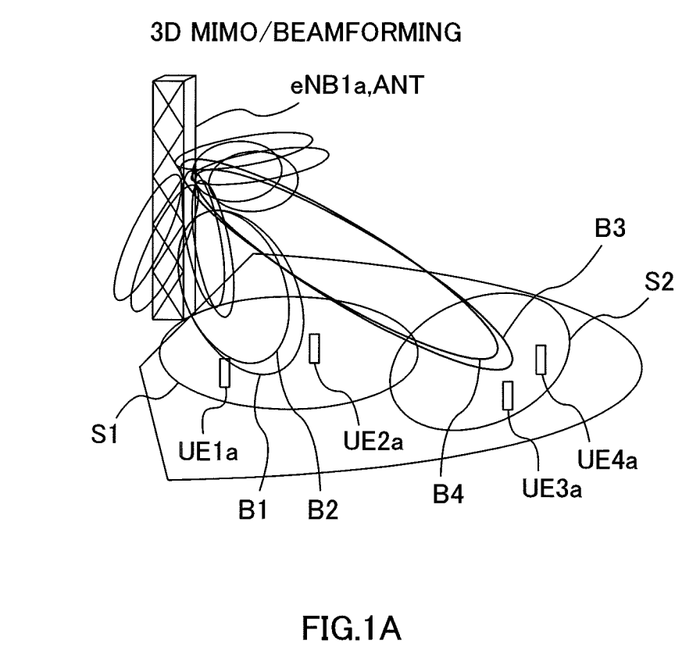
FIG. 1 provides diagrams to show a communication scheme that may be applied to an LTE-A system.
Figure 1B:
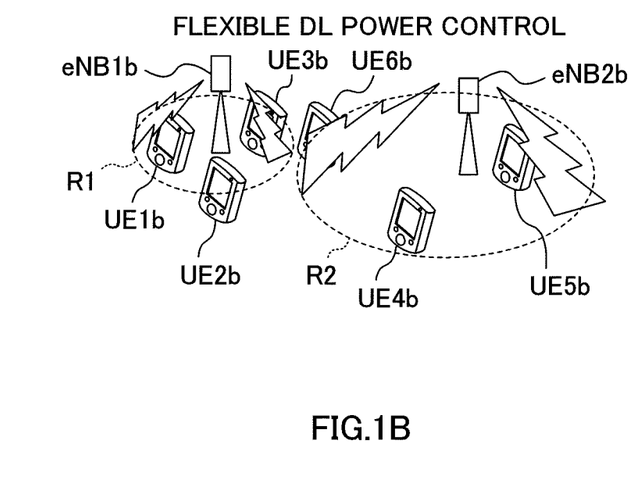

FIG. 1 provides diagrams to show a communication scheme that may be applied to an LTE-A system. FIG. 1A shows beam forming, which gives vertical directivity to beams transmitted from a base station apparatus, and MIMO to use this (referred to as "3D MIMO/beam forming," for example), and FIG. 1B shows a communication scheme, which controls the transmission power from the base station apparatus flexibly (referred to as "flexible downlink power control," for example).

As shown in FIG. 1A, in a system where 3D MIMO/beam forming is applied, beams that are the same as heretofore are output, and also, beams having vertical directivity are output to each terminal apparatus UE 1a, UE 2a, UE 3a and UE 4a from the antenna ANT of a base station apparatus eNB 1. In this way, by outputting beams with different tilt angles from the antenna ANT of the base station apparatus eNB 1a, space is divided into a plurality of sectors (in FIG. 1A, sectors S1 and S2). Here, the tilt angle means the angle of beams with respect to the horizontal direction (for example, the ground).

For example, in FIG. 1A, a sector S1, which is close to the base station apparatus eNB 1a, is formed with two beams B1 and B2, which are output from the antenna ANT and have large tilt angles. A sector S2, which is far from the base station apparatus eNB 1a, is formed with two beams B3 and B4, which are output from the antenna ANT and have small tilt angles. The base station apparatus eNB 1a carries out downlink radio communication with terminal apparatuses UE 1a and UE 2a in the sector S1, and carries out downlink radio communication with terminal apparatuses UE 3a and UE 4a in the sector S2. Note that a plurality of beams may be output from one antenna ANT as shown in FIG. 1A, or may be output from a plurality of antennas (not shown). FIG. 1A shows an example of a case where an array antenna, which includes a plurality of antenna elements arranged vertically, is used as the antenna ANT.

As shown in FIG. 1B, in a system where flexible downlink power control is applied, the transmission power of the base station apparatuses eNB 1b and eNB 2b is dynamically controlled, depending on the communication environment. For example, the transmission power of the base station apparatus eNB 1b is controlled, so that the transmission power of the base station apparatus eNB 1b becomes smaller than the transmission power of the base station apparatus eNB 2b, and the transmission range R1 of the base station apparatus eNB 1b becomes smaller than the transmission range R2 of the base station apparatus eNB 2b. The base station apparatus eNB 1b carries out downlink radio communication with the terminal apparatuses UE 1b, UE 2b and UE 3b in the transmission range R1, and the base station apparatus eNB 2b carries out downlink radio communication with the terminal apparatuses UE 4b, UE 5b and UE 6b in the transmission range R2. Note that one of or both of 3D MIMO/beam forming and flexible downlink power control may be applied.

In a system where these communication schemes are applied, a transmission mode (TM 9) to use DM-RSs (DeModulation-Reference Signals), which are user-specific reference signals, is effective. This TM 9 is a transmission mode that is added anew in LTE-A (Rel. 10), and supports MU-MIMO up to rank 8. In TM 9, demodulation is carried out using DM-RSs. Note that a DCI format 2C is defined to support TM 9.

In TM 9, downlink channel quality information (CQI: Channel Quality Indicator) is measured based on CSI-RSs (Channel State Information-Reference Signals). Here, the CSI-RSs are cell-specific reference signals, so that beam forming or power control is not executed per user even when 3D MIMO/beamforming or flexible downlink power control is applied. Consequently, when 3D MIMO/beam forming or flexible downlink power control is applied, it is difficult to adequately evaluate the state of downlink transmission paths corresponding to each user based on CQIs alone, which are measured based on CSI-RSs.

Figure 2:
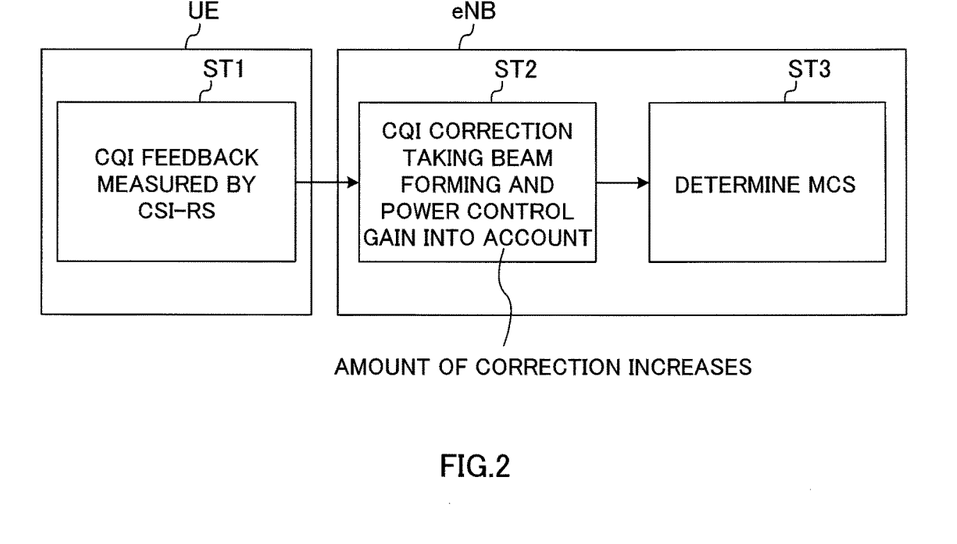
FIG. 2 is a diagram to show the steps to determine MCS based on CQIs.

FIG. 2 is a diagram to show the steps to determine MCS (modulation scheme and coding rate) based on CQIs. As has been described above, it is not possible to adequately evaluate the state of transmission paths, based on CQIs alone, which are measured based on CSI-RSs. Consequently, when CQIs are fed back from a terminal apparatus UE (step ST 1), a base station apparatus eNB corrects the CQIs (step ST 2) taking into account the influence of beam forming or power control, and determines MCS (step ST 3). However, there are errors in correction conducted by the base station apparatus eNB, so if the amount of correction increases by conducting beam forming or power control positively, this may result in a greater deviation from an adequate MCS and deteriorated communication characteristics.

This problem is attributed to the fact that CQIs alone, which are measured based on CSI-RSs, cannot adequately evaluate the state of transmission paths when beam forming and power control are adopted. The present inventors have focused on this point, and completed the present invention upon finding out that, if CQIs are measured with user-specific reference signals that allow beam forming or power control, it is possible to acquire CQIs that adequately represent the state of each user's transmission path. That is, a gist of the present invention is to feed back CQIs using DM-RSs, which are user-specific (terminal-specific) reference signals.

A CQI feedback according to the present embodiment will be described below. First, DM-RSs transmitted on the downlink will be explained. In one resource block defined in LTE, DM-RSs are allocated not to overlap with the PDCCH (Physical Downlink Control CHannel), in which control signals are multiplexed, the PDSCH (Physical Downlink Shared CHannel), in which downlink data signals are multiplexed, CRSs and CSI-RSs, which are reference signals, and so on. Note that one resource block is formed with twelve subcarriers that are consecutive in the frequency direction and fourteen symbols that are consecutive in the time axis direction.

In the downlink, DM-RSs are allocated to twenty-four resource elements in one resource block. In one resource block, forty resource elements are secured for CSI-RSs, but, for example, when the number of CSI-RS ports is eight, CSI-RSs are allocated to only eight resource elements. That is, in one resource block, DM-RSs are allocated more densely than CSI-RSs.

Although DM-RSs are allocated to all the subframes, CSI-RSs are allocated in a predetermined cycle, which is, for example, a ten-subframe cycle. Consequently, DM-RSs are transmitted more frequently than CSI-RSs. Furthermore, while DM-RSs are defined as UE-specific reference signals and allow beam forming or power control, CSI-RSs are cell-specific reference signals and cannot support beam forming or power control per user. Although these DM-RSs are used for demodulation of downlink data signals that are multiplexed with the PDSCH and so on, in the CQI feedback according to the present embodiment, DM-RSs are used for measurements of CQIs.

Figure 3:
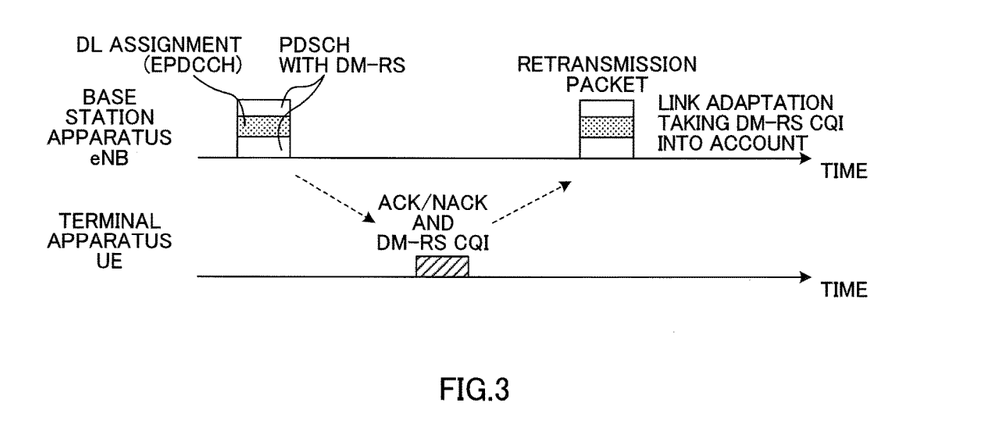
FIG. 3 is a diagram to explain sequences related to the CQI feedback according to the present embodiment.

Next, a new CQI feedback according to the present embodiment will be described. FIG. 3 is a diagram to explain sequences related to the CQI feedback according to the present embodiment. Note that in the system shown in FIG. 3, a radio resource configuration that is suitable for user-specific (UE-specific) control is applied. To be more specific, the PSS/SSS (Primary Synchronization Signal/Secondary Synchronization Signal), the CRS (Cell-specific Reference Signal), the PDCCH (Physical Downlink Control CHannel) and so on in LTE are not used, and a radio resource configuration that is designed based on the EPDCCH (Enhanced Physical Downlink Control CHannel) and the DM-RS (Demodulation-Reference Signal) is applied. However, the radio resource configuration that is used for the CQI feedback according to the present embodiment is by no means limited to this. For example, a radio resource configuration to use the PDCCH may be applied as well.

The EPDCCH uses a predetermined frequency band in the resource region for data signals including the PDSCH and so on, as a resource region for control signals including the PDCCH and so on. The EPDCCH allocated to the resource region for data signals is demodulated by the DM-RS. Note that the EPDCCH may be referred to as "FDM-type PDCCH," or may be referred to as "UE-PDCCH."

In the system shown in FIG. 3, the base station apparatus eNB transmits the DM-RS with the PDSCH to the terminal apparatus UE. The EPDCCH is multiplexed over resources that do not overlap with the PDSCH and the DM-RS in the frequency direction. With this EPDCCH, a downlink assignment (DL assignment), which is downlink control information, is transmitted. In the CQI feedback according to the present embodiment, first, the base station apparatus eNB transmits the DM-RS with the PDSCH to the terminal apparatus UE. The terminal apparatus UE having received the DM-RS transmitted from the base station apparatus eNB measures a CQI based on the DM-RS received signal strength and so on. The measured CQI is transmitted from the terminal apparatus UE to the base station apparatus eNB on the uplink.

The DM-RS is transmitted to the terminal apparatus UE with the PDSCH. Consequently, the CQI, which is measured based on the DM-RS (hereinafter "DM-RS CQI"), can be transmitted from the terminal apparatus UE to the base station apparatus eNB at the same time as the ACK/NACK for the downlink data signal, which is transmitted by the PDSCH. If the DM-RS CQI can be fed back at the same time as the ACK/NACK like this, the base station apparatus eNB can employ link adaptation by the DM-RS CQI, when there is a retransmission packet, data to which successive packets are allocated and so on. That is, the base station apparatus eNB can determine transmission parameters in a state the condition of the transmission paths is taken into account, so that it is possible to improve communication characteristics. However, the DM-RS may be transmitted from the terminal apparatus UE to the base station apparatus eNB at times different from the ACK/NACK.

The DM-RS CQI can be fed back to the base station apparatus eNB using, for example, format 3 of the PUCCH (Physical Uplink Control CHannel) (PUCCH format 3). The DM-RS CQI may be fed back using the PUSCH (Physical Uplink Shared CHannel) (aperiodic CSI feedback). A new uplink control channel may be provided to feed back the DM-RS CQI.

The DM-RS CQI feedback can be triggered by a downlink assignment (DL assignment) that is transmitted from the base station apparatus eNB to the terminal apparatus UE through the EPDCCH. In this case, for example, bits to trigger a DM-RS CQI feedback may be defined anew in a downlink assignment, or conventional bits of a downlink assignment may be re-used to trigger a DM-RS CQI feedback. When a radio resource configuration of the LTE scheme is used, the downlink assignment is transmitted from the base station apparatus eNB to the terminal apparatus UE through the PDCCH. Similarly, also in this case, bits to trigger a DM-RS CQI feedback may be defined anew, or conventional bits may be re-used to trigger a DM-RS CQI feedback.

The terminal apparatus UE, to which a trigger ON of a DM-RS CQI feedback is reported by the downlink assignment such as described above, transmits a DM-RS CQI with ACK/NACK. The terminal apparatus UE, to which a trigger OFF of a DM-RS CQI feedback is reported, only transmits ACK/NACK to the base station apparatus eNB. By using the bits included in the downlink assignment, the base station apparatus eNB can direct a DM-RS CQI feedback to the terminal apparatus UE at necessary times.

In this way, with the present embodiment, the terminal apparatus UE measures a CQI based on the DM-RS, which is a user-specific (terminal-specific) reference signal that allows beam forming and power control, and transmits the result to the base station apparatus eNB, so that it is possible to feed back adequate channel quality information even in a system where beam forming, power control and so on are applied. The DM-RS is transmitted frequently and densely compared to the CSI-RS, so that it is possible to feed back a DM-RS CQI at arbitrary times when necessary.

The base station apparatus eNB determines the MCS based on the DM-RS CQI that is fed back like this. Then, the base station apparatus eNB performs radio communication with the terminal apparatus UE using the determined MCS. Since beam forming and power control are taken into account in the DM-RS CQI, correction is not needed when determining the MCS. Even when correction is carried out, minimal correction suffices. Consequently, it is possible to prevent the deterioration of communication characteristics due to correction.

Note that, here, although only the DM-RS CQI feedback has been described as an example, it is equally possible to feed back an RI (Rank Indicator) in addition to the DM-RS CQI. The DM-RS CQI feedback may be used together with a CQI feedback measured based on the CSI-RS (hereinafter "CSI-RS CQI"). It is possible to optimize communication characteristics by switching or combining the DM-RS CQI feedback and the CSI-RS CQI feedback if necessary.

Figure 4:
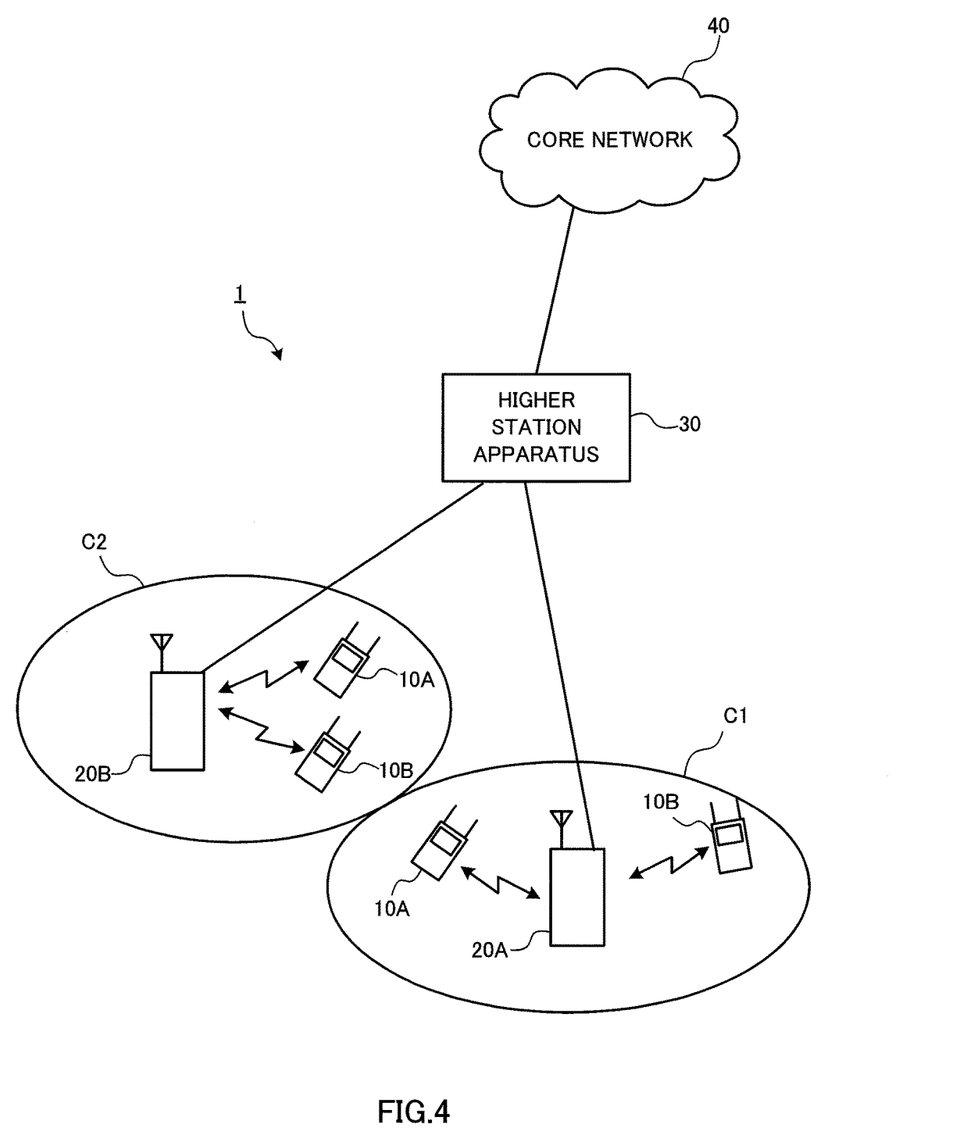
FIG. 4 is a diagram to show a system configuration of a radio communication system.

Next, a radio communication system according to the present embodiment will be described in detail. FIG. 4 is a diagram to show a system configuration of a radio communication system according to the present embodiment. Note that the radio communication system shown in FIG. 4 is a system to accommodate, for example, the LTE system and the LTE-A system. This radio communication system uses carrier aggregation to group a plurality of fundamental frequency blocks into one, where the system band of the LTE system is one unit. This radio communication system may be referred to as "IMT-Advanced" or may be referred to as "4G."

As shown in FIG. 4, a radio communication system 1 includes base station apparatuses 20A and 20B, and a plurality of terminal apparatuses 10A and 10B, which communicate with these base station apparatuses 20A and 20B. The radio communication system 1 is configured such that application of 3D MIMO/beamforming or flexible downlink power control is possible. The base station apparatuses 20A and 20B are connected with a higher station apparatus 30, and this higher station apparatus 30 is connected with a core network 40. The terminal apparatuses 10A and 10B can communicate with the base station apparatuses 20A and 20B in cells C1 and C2. Note that the higher station apparatus 30 includes, for example, an access gateway apparatus, a radio network controller (RNC), a mobility management entity (MME) and so on, but is by no means limited to these.

Although the terminal apparatuses 10A and 10B may be LTE terminals and LTE-A terminals, the following description will be given simply with respect to "terminal apparatuses 10A and 10B," unless specified otherwise. Also, the terminal apparatuses 10A and 10B are not limited to mobile terminal apparatuses, and may be user terminals (UE: User Equipment) including fixed terminal apparatuses as well. Note that the terminal apparatuses 10A and 10B both have the same configuration, so that the following description will be given with respect to "terminal apparatus 10." The base station apparatuses 20A and 20B both have the same configuration, so that the following description will be given with respect to "base station 20."

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing a system band into bands formed with one or continuous resource blocks per terminal, and allowing a plurality of terminals to use mutually different bands.

Communication channels in the radio communication system 1 will be described. Downlink communication channels include a PDSCH (Physical Downlink Shared CHannel), which is used by each user terminal apparatus 10A and 10B on a shared basis as a downlink data channel, and downlink L1/L2 control channels (PDCCH, PCFICH and PHICH). User data and higher control information are transmitted by the PDSCH. Scheduling information and so on for the PDSCH and the PUSCH (Physical Uplink Shared CHannel) is transmitted by the PDCCH (Physical Downlink Control CHannel). The number of OFDM symbols to use for the PDCCH is transmitted by the PCFICH (Physical Control Format Indicator CHannel). HARQ ACK and NACK for the PUSCH are transmitted by the PHICH (Physical Hybrid-ARQ Indicator CHannel).

Uplink communication channels include the PUSCH, which is used by each terminal apparatus on a shared basis as an uplink data channel, and the PUCCH (Physical Uplink Control CHannel), which is an uplink control channel. User data and higher control information are transmitted by this PUSCH. Downlink channel quality information (CQI: Channel Quality Indicator), ACK/NACK and so on are transmitted by the PUCCH.

Figure 5:
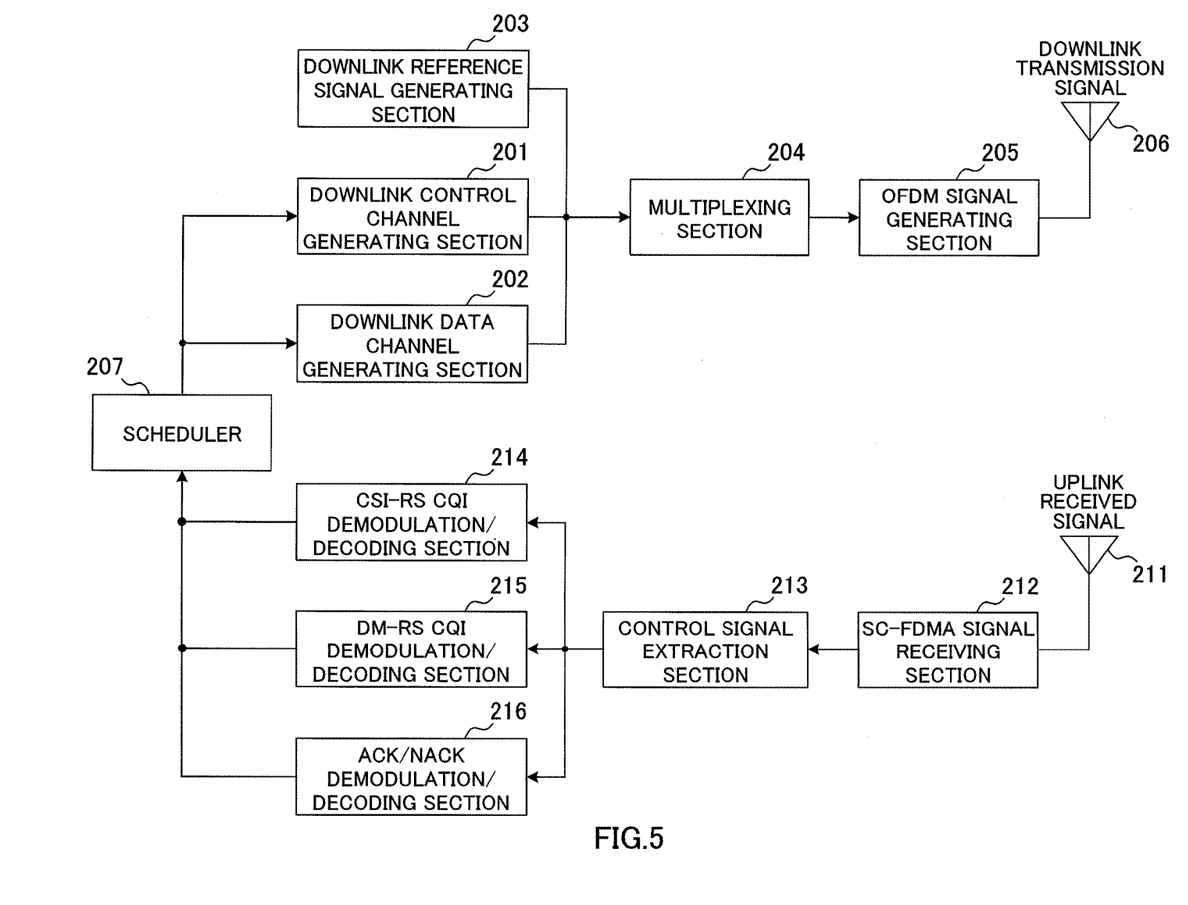
FIG. 5 is a diagram to show a configuration of a base station apparatus.

A functional block of the base station apparatus 20 will be described with reference to FIG. 5. The base station apparatus 20 has, as configuration elements of the transmitting side, a downlink control channel generating section 201, a downlink data channel generating section 202, a downlink reference signal generating section 203, a multiplexing section 204, an OFDM signal generating section (transmitting section) 205, a transmitting antenna 206 and a scheduler 207. As configuration elements of the receiving side, the base station apparatus 20 has a receiving antenna 211, an SC-FDMA signal receiving section (receiving section) 212, a control signal extraction section 213, a CSI-RS CQI demodulation/decoding section 214, a DM-RS CQI demodulation/decoding section 215, and an ACK/NACK demodulation/decoding section 216.

The downlink control channel generating section 201 generates downlink control information by control of the scheduler 207, and also generates a downlink control channel by performing channel coding and data modulation of the generated downlink control information. The downlink control channel generated in the downlink control channel generating section 201 is output to the multiplexing section 204. In the radio communication system 1 according to the present embodiment, as described above, a DM-RS CQI feedback is triggered by a downlink assignment. Consequently, the downlink control channel generating section 201 generates downlink control information including bits to trigger a DM-RS CQI feedback.

The downlink data channel generating section 202 generates downlink transmission data, and generates a downlink data channel by performing channel coding and data modulation of the generated transmission data. The downlink data channel generated in the downlink data channel generating section 202 is output to the multiplexing section 204. The downlink reference signal generating section 203 generates downlink reference signals (CSI-RS, DM-RS and so on). The downlink reference signals generated in the downlink reference signal generating section 203 are output to the multiplexing section 204.

The multiplexing section 204 synthesizes the downlink control channel, the downlink reference signals and the downlink data channel, and generates a transmission signal. For example, when the radio resource configuration shown in FIG. 3 is applied, the multiplexing section 204 generates a transmission signal in which the PDSCH and the EPDCCH are multiplexed in the frequency direction. The generated transmission signal is output to the OFDM signal generating section 205.

The OFDM signal generating section 205 applies an IFFT (Inverse Fast Fourier Transform) to the transmission signal from the multiplexing section 204, and converts the signal from a frequency domain signal to a time domain signal. The OFDM signal generating section 205 adds CPs (Cyclic Prefixes) to the converted transmission signal. In addition, the OFDM signal generating section 205 amplifies the transmission signal to which CPs have been added, and generates an OFDM signal. The OFDM signal generated in the OFDM signal generating section 205 is transmitted from the transmitting antenna 206 to the terminal apparatus 10.

The scheduler 207 performs scheduling based on a CSI-RS CQI, a DM-RS CQI and ACK/NACK that are reported from the terminal apparatus 10. To be more specific, the scheduler 207 decides MCS based on a CSI-RS CQI or a DM-RS CQI and carries out transmission control using the decided MCS. Also, the scheduler 207 carries out retransmission control based on ACK/NACK.

An uplink signal from the terminal apparatus 10 is received by the receiving antenna 211, and transmitted to the SC-FDMA signal receiving section 212. The SC-FDMA signal receiving section 212 removes the CPs from the received signal. The SC-FDMA signal receiving section 212 applies an FFT (Fast Fourier Transform) to the received signal from which the CPs have been removed, and converts the signal from a time domain signal to a frequency domain signal. The converted received signal is transmitted to the control signal extraction section 213.

The control signal extraction section 213 extracts control signals from the received signal. The extracted control signals are output to the CSI-RS CQI demodulation/decoding section 214, DM-RS CQI demodulation/decoding section 215, and ACK/NACK demodulation/decoding section 216 respectively.

The CSI-RS CQI demodulation/decoding section 214 demodulates and decodes the CSI-RS CQI from the extracted control signal. The DM-RS CQI demodulation/decoding section 215 demodulates and decodes the DM-RS CQI from the extracted control signal. In addition, the ACK/NACK demodulation/decoding section 216 demodulates and decodes ACK/NACK from the extracted control signal. The demodulated and decoded CSI-RS CQI, DM-RS CQI, and ACK/NACK are output to the scheduler 207 and used for transmission control.

Figure 6:
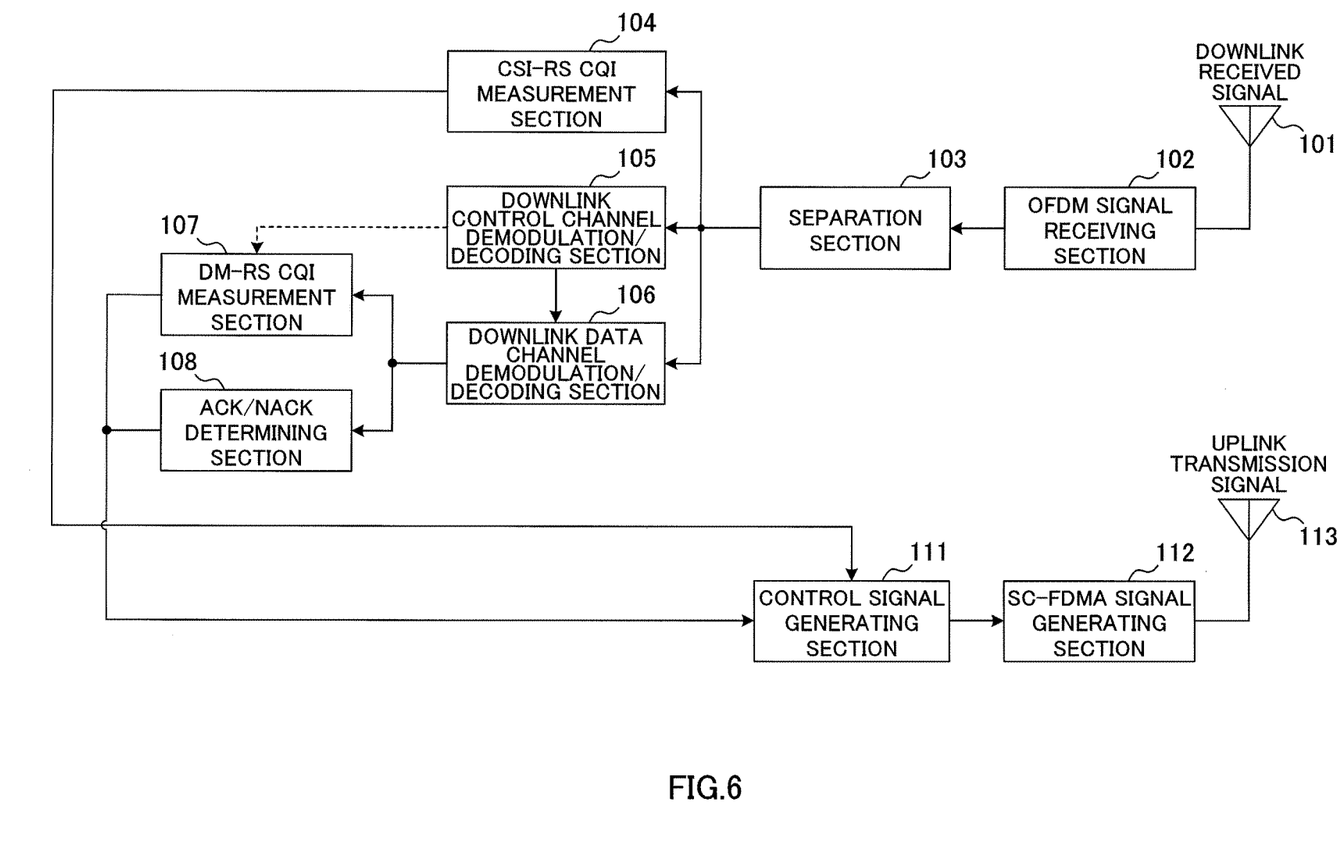
FIG. 6 is a diagram to show a configuration of a terminal apparatus.

A functional block of the terminal apparatus 10 will be described with reference to FIG. 6. The terminal apparatus 10 has, as configuration elements of the receiving side, a receiving antenna 101, an OFDM signal receiving section (receiving section) 102, a separation section 103, a CSI-RS CQI measurement section 104, a downlink control channel demodulation/decoding section 105, a downlink data channel demodulation/decoding section 106, a DM-RS CQI measurement section 107, and an ACK/NACK determining section 108. As configuration elements of the transmitting side, the terminal apparatus 10 has a control signal generating section 111, an SC-FDMA signal generating section (transmitting section) 112 and a transmitting antenna 113.

The downlink signal from the base station apparatus 20 is received by the receiving antenna 101, and transmitted to the OFDM signal receiving section 102. The OFDM signal receiving section 102 removes the CPs from the received signal. The OFDM signal receiving section 102 applies an FFT (Fast Fourier Transform) to the received signal from which the CPs have been removed, and converts the received signal from a time domain signal to a frequency domain signal. The converted received signal is transmitted to the separation section 103.

The separation section 103 separates the reference signals, the downlink control channel, and the downlink data channel from the received signal. Among the separated reference signals, the CSI-RS is output to the CSI-RS CQI measurement section 104. The downlink control channel is output to the downlink control channel demodulation/decoding section 105.

The downlink data channel is output to the downlink data channel demodulation/decoding section 106. Among the separated reference signals, the DM-RS is output to the downlink data channel demodulation/decoding section 106, too.

The CSI-RS CQI measurement section 104 measures the CSI-RS CQI based on the CSI-RS received signal strength and so on. The measured CSI-RS CQI is output to the control signal generating section 111. The downlink control channel demodulation/decoding section 105 demodulates and decodes the downlink control channel. In the radio communication system 1 according to the present embodiment, a DM-RS CQI feedback is triggered by a downlink assignment. Consequently, the downlink control channel demodulation/decoding section 105 determines if there is a trigger related to a DM-RS CQI feedback or not in the demodulated and decoded downlink assignment, and reports the result to the DM-RS CQI measurement section 107.

The downlink data channel demodulation/decoding section 106 demodulates and decodes the downlink data channel based on the DM-RS. For example, when 3D MIMO/beam forming and so on is applied, a precoding weight is determined from the DM-RS, and the downlink data channel is demodulated and decoded using the determined precoding weight. After that, the DM-RS is output to the DM-RS CQI measurement section 107. The result of the downlink data channel demodulation and decoding is output to the ACK/NACK determining section 108.

The DM-RS CQI measurement section 107 measures the DM-RS CQI based on the DM-RS received signal strength and so on, if the DM-RS CQI feedback is triggered (trigger ON) in the downlink assignment that is demodulated and decoded in the downlink control channel demodulation/decoding section 105. In this case, the DM-RS CQI measurement section 107 outputs the measured DM-RS CQI to the control signal generating section 111. If the DM-RS CQI feedback is not triggered (trigger OFF) in the downlink assignment, the DM-RS CQI measurement section 107 does not measure the DM-RS CQI.

The ACK/NACK determining section 108 determines ACK if the downlink data channel demodulation/decoding section 106 can demodulate and decode the downlink data channel. The ACK/NACK determining section 108 determines NACK if the downlink data channel demodulation/decoding section 106 cannot demodulate and decode the downlink data channel. The determined result is output to the control signal generating section 111.

The control signal generating section 111 generates control signals including the CSI-RS CQI, the DM-RS CQI, the ACK/NACK and so on. If the DM-RS CQI feedback is triggered, the DM-RS CQI is transmitted from the DM-RS CQI measurement section 107, so that the control signal generating section 111 generates control signals including the DM-RS CQI. If the DM-RS CQI feedback is not triggered, the DM-RS CQI is not transmitted from the DM-RS CQI measurement section 107, so that the control signal generating section 111 generates control signals not including the DM-RS CQI. The control signals generated in the control signal generating section 111 are output to the SC-FDMA signal generating section 112.

The DM-RS CQI is transmitted to the base station apparatus 20 using, for example, format 3 of the PUCCH (Physical Uplink Control CHannel) (PUCCH format 3). The DM-RS CQI may be transmitted using the PUSCH (Physical Uplink Shared CHannel) (aperiodic CSI feedback). A new uplink control channel to feed back the DM-RS CQI may be provided.

The SC-FDMA signal generating section 112 applies an IFFT (Inverse Fast Fourier Transform) to the transmission signal including the control signals transmitted from the control signal generating section 111, and converts the signal from a frequency domain signal to a time domain signal. The SC-FDMA signal generating section 112 adds CPs (Cyclic Prefixes) to the converted transmission signal. The SC-FDMA signal generating section 112 amplifies the transmission signal to which CPs have been added, and generates an SC-FDMA signal, which becomes an uplink transmission signal. The SC-FDMA signal generated in the SC-FDMA signal generating section 112 is transmitted from the transmitting antenna 113 to the base station apparatus 20.

As described above, with the radio communication system 1 according to the present embodiment, the terminal apparatus 10 measures a CQI based on the DM-RS, which is a user-specific (terminal-specific) reference signal that allows beam forming and power control, and transmits the result to the base station apparatus 20, so that it is possible to feed back adequate channel quality information even in a system where beam forming, power control and so on are applied. The DM-RS is transmitted frequently and densely compared to the CSI-RS, so that it is possible to feed back a DM-RS CQI at arbitrary times when necessary.

The present invention is by no means limited to the above embodiment and can be implemented in various modifications. For example, although an example of application to a radio communication system in which 3D MIMO/beam forming and flexible downlink power control are adopted has been described with the above embodiment, the present invention is equally applicable to other radio systems. Also, without departing from the scope of the present invention, it is possible to change the number of processing sections, the order of processes and so on in the above description and implement them. Besides, the present invention can be implemented with various changes, without departing from the scope of the present invention.

The disclosure of Japanese Patent Application No. 2012-165176, filed on Jul. 25, 2012, including the specification, drawings, and abstract, is incorporated herein by reference in its entirety.

The invention claimed is:

1. A communication system in which a terminal apparatus receives a downlink data signal transmitted from a base station apparatus in a radio resource region for a downlink data signal, wherein:
   the base station apparatus transmits the downlink data signal and a terminal-specific reference signal in the radio resource region for the downlink data signal to the terminal apparatus; and
   the terminal apparatus measures channel quality information based on the terminal-specific reference signal and transmits the measured channel quality information to the base station apparatus, together with an ACK/NACK for the downlink data signal,
   wherein beam forming and a tilt angle is applied to the downlink transmission, and terminal-specific reference signals are mapped in a resource block more densely than cell-specific reference signals and/or are transmitted over multiple subframes more frequently than the cell-specific reference signals.

2. The communication system according to claim 1, wherein;
   the base station apparatus periodically transmits a cell-specific reference signal to the terminal apparatus; and
   the terminal apparatus measures the channel quality information based on the terminal-specific reference signal and the cell-specific reference signal, and transmits the measured channel quality information to the base station apparatus.

3. The communication system according to claim 2, wherein the terminal-specific reference signal is a DM-RS (DeModulation-Reference Signal), and the cell-specific reference signal is a CSI-RS (Channel State Information-Reference Signal).

4. The communication system according to claim 3, wherein the base station apparatus determines a modulation scheme and a coding rate based on the channel quality information.

5. The communication system according to claim 1, wherein the base station apparatus includes, in downlink control information that is transmitted to the terminal apparatus, bit information that triggers a transmission of the channel quality information measured based on the terminal-specific reference signal to the base station apparatus.

6. A base station apparatus that transmits a downlink data signal received by a terminal apparatus in a radio resource region for a downlink data signal, the radio base station comprising:
   a transmitting section that transmits the downlink data signal and a terminal-specific reference signal in the radio resource region for the downlink data signal to the terminal apparatus; and
   a receiving section that receives channel quality information that is measured in the terminal apparatus based on the terminal-specific reference signal and transmitted, together with an ACK/NACK for the downlink data signal,
   wherein beam forming and a tilt angle is applied to the downlink transmission, and terminal-specific reference signals are mapped in a resource block more densely than cell-specific reference signals and/or are transmitted over multiple subframes more frequently than the cell-specific reference signals.

7. A terminal apparatus that receives a downlink data signal transmitted in a radio resource region for a downlink data signal from a base station apparatus, the terminal apparatus comprising:
   a receiving section that receives the downlink data signal and a terminal-specific reference signal transmitted in the radio resource region for the downlink data signal from the base station apparatus;
   a channel quality information measurement section that measures channel quality information based on the received terminal-specific reference signal; and
   a transmitting section that transmits the measured channel quality information to the base station apparatus, together with an ACK/NACK for the downlink data signal,
   wherein beam forming and a tilt angle is applied to the downlink transmission, and terminal-specific reference signals are mapped in a resource block more densely than cell-specific reference signals and/or are transmitted over multiple subframes more frequently than the cell-specific reference signals.

8. A communication method in which a terminal apparatus receives a downlink data signal transmitted in a radio resource region for a downlink data signal from a base station apparatus, the communication method comprising the steps in which:
   the base station apparatus transmits the downlink data signal and a terminal-specific reference signal in the radio resource region for the downlink data signal to the terminal apparatus; and
   the terminal apparatus measures channel quality information based on the terminal-specific reference signal and transmits the measured channel quality to the base station apparatus, together with an ACK/NACK for the downlink data signal,
   wherein beam forming and a tilt angle is applied to the downlink transmission, and terminal-specific reference signals are mapped in a resource block more densely than cell-specific reference signals and/or are transmitted over multiple subframes more frequently than the cell-specific reference signals.

* * * * *